March 2, 1971  D. H. KEISER, JR  3,566,467
HEDGE SHEARS
Filed April 30, 1968
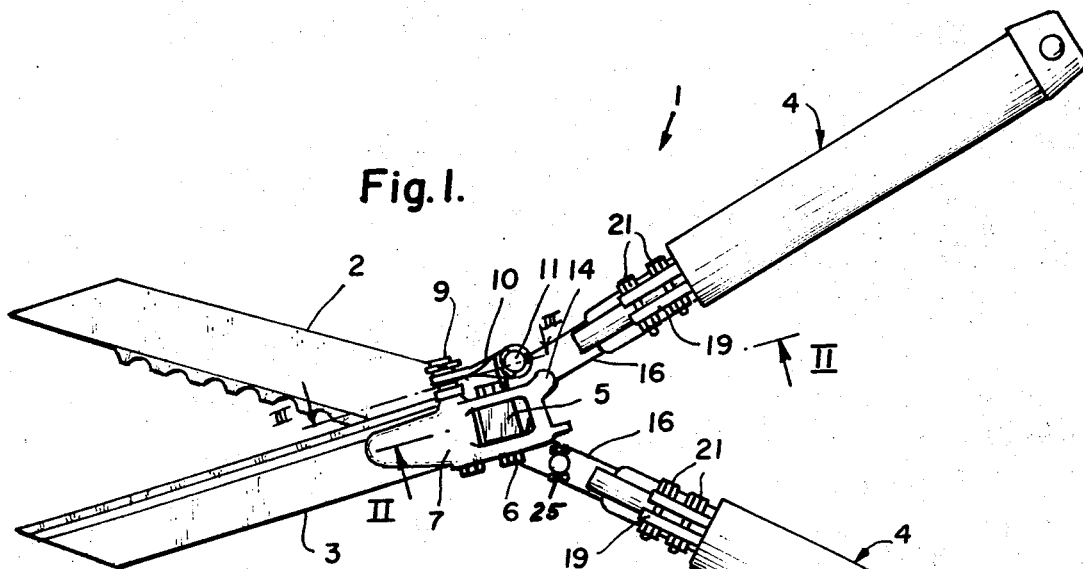
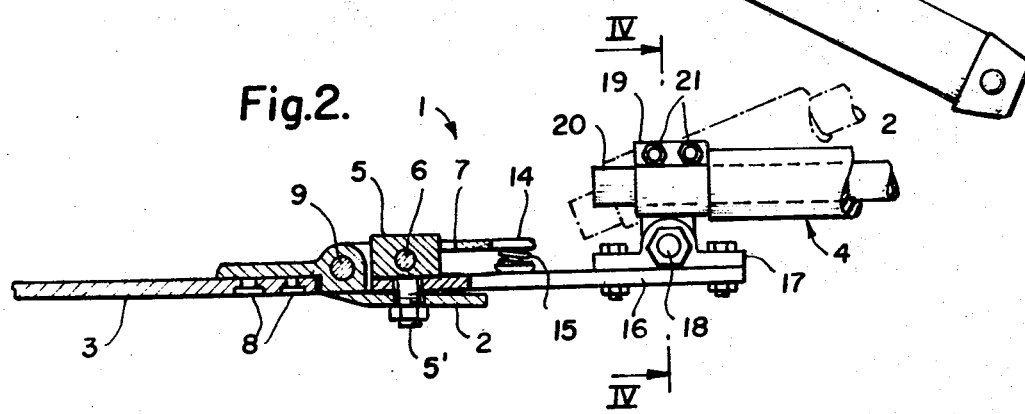
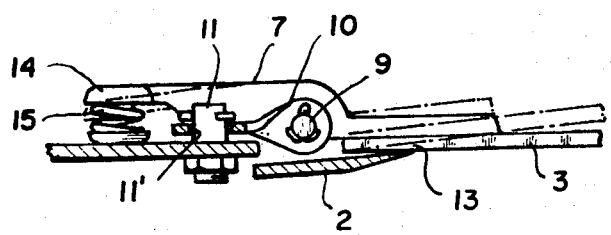
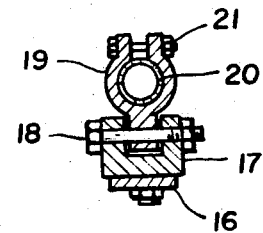
INVENTOR.
DAVID H. KEISER, JR.
BY
*William J. Ruano*
his ATTORNEY

United States Patent Office 3,566,467
Patented Mar. 2, 1971

3,566,467
HEDGE SHEARS
David H. Keiser, Jr., 53 Park Road,
Wyomissing Hills, Pa. 19610
Filed Apr. 30, 1968, Ser. No. 725,296
Int. Cl. B26b *13/00*
U.S. Cl. 30—257
1 Claim

ABSTRACT OF THE DISCLOSURE

Hedge shears in which one of the blades pivotally moves away from the plane of the other under the resistance of a spring as the blades are moved to the closed position in the cutting of a hedge. Adjustable handles are provided which allow adjustment of the length thereof as well as inclination with respect to the plane of the blade to facilitate cutting of the hedge.

---

This invention relates generally to a shearing device and, more particularly, to a manually operated hedge shear.

A disadvantage of commonly used hedge shears is that they require considerable manual force for operation, causing tiring and possibly blistering of the hands, also since the handles are in substantially the same plane as the blades, they do not lend themselves to easy or comfortable handling and accurate cutting of the surface of a hedge.

Another disadvantage is that the parts, such as the handles, are not replaceable.

An object of the present invention is to provide novel hedge shears which will overcome all of the above-named disadvantages.

A more specific object of the present invention is to provide novel hedge shears in which one of the blades is pivoted with respect to the other in two planes, namely, the plane of the pivotal cutting action and a plane at right angles thereto against the resistance of a spring, so as to facilitate cutting action.

Another object of the invention is to provide a novel handle construction for hedge shears which enables adjustment in length as well as replacement of the handles and, in addition, permits adjustment of the angle of the handles with respect to the blades to provide greater comfort and accuracy in shearing hedges and the like.

Other objects and advantages will become more apparent from a study of the following description taken with the accompanying drawing wherein:

FIG. 1 is a top, or plan view of hedge shears embodying the present invention;

FIG. 2 is a vertical, cross-sectional view taken along line II—II of FIG. 1;

FIG. 3 is a cross-sectional view taken along line III—III of FIG. 1; and,

FIG. 4 is a cross-sectional view taken along line IV—IV of FIG. 2.

Referring more particularly to the drawing, numeral 1 generally denotes a pair of hedge shears embodying the present invention and comprising a pair of cutting blades 2 and 3 which are pivotally connected together by a bolt 5' whose shank is integral with a block 5. Blade 2 is preferably honed on the surface shown in FIG. 1 and serrated along its cutting edge as shown.

Integrally attached to the respective blades 2 and 3, through suitable adjusting means, are handles 4 which may be either of solid material, such as metal, or metal rods 20 covered with sponge rubber tubes as more clearly shown in FIG. 2.

Cutting blade 3 is also pivotally mounted so that its plane may tlit slightly with respect to the plane of cutting edge 2. This is accomplished by rigidly attaching, to the blade 3, a frame element 7 which is pivoted to block 5 by means of bolt 6. Resistance to such tilting movement is provided by a helical spring 15 having an end which bears against an extension 14 of frame element 7. A rigid pin is integrally connected to extension 14 (see FIG. 3) to serve as a guide for the spring 15.

Rigidly secured to the handle shank 16 of blade 3 is a link 10 having one end loosely pivoted to a pin 11 and another end, twisted at right angles to the other end, is loosely pivoted to a pin 9. It will be understood that the two shanks 16 are integral with the respective blades 2 and 3. As the result of the above described connection between shank 16 and blade 3, including the frame 7 and link 10, as the handles 4 are moved together so as to progressively close blades 2 and 3, the only point of contact between blades 2 and 3 will be where their cutting edges intersect, which point of contact will progressively more outwardly toward the extremities of the blades as the blades are pivotally brought together. In so doing, the portions of the blades closest to their pivot will gradually separate slightly so as to avoid frictional resistance between the inner surfaces. At the same time blade 3, when it meets the resistance provided by the hedge which is being sheared, will tilt about the axis of bolt 6 as a center in a plane at right angles to the cutting plane. Blade 3 will progressively tilt away from the plane of blade 2 as the aforesaid point of contact between the cutting edges of the blades moves outwardly. The link 10 will tend to cant blade 3 slightly so that it will always contact the cutting edge of blade 2. Of course the slight tilting of blade 3 about bolt 6 is yieldingly resisted by spring 15. Thus a very easy cutting action is provided requiring minimum exertion of manual effort because of minimum frictional resistance between blades 2 and 3 during cutting.

A pin and cross bolt 25 on shank 16 serves as a stop to limit movement of frame element 7.

Both handles are adjustably and pivotally secured to their respective shanks 16 in the manner shown in FIG. 2. More specifically, bolted to the end portion of shank 16 is a bearing block 17 through which extends a bolt 18 which also extends through a downward extension of clamp 19 (see FIG. 4) to provide a pivot therefor. Clamp 19 is fastened by means of a bolt 21 to the handle 20. Therefore, handle 20 may be tilted to the position shown in dot and dash outline in FIG. 2 or to any other selected angular position after first loosening bolt 18. When the most comfortable angle of the handles relative to the blades is obtained, bolt 18 is tightened and the selected angular position of the handle is maintained. It will be noted that the plane of the handles is slightly offset and parallel to the plane of the blades in the position illustrated in full lines in FIG. 2.

In many instances it is desirable to adjust the length of the handles 20. This can be done by loosening bolts 21 and sliding handles 20 in either direction within clamp 19. In other instances, it may be desired to completely replace the handle with much longer handles, which can be done by completely removing handles 20, after loosening bolts 21, and substituting new handles of much longer length. Such long length handles are particularly useful in cutting stronger objects than hedges, such as branches of a tree, since they provide greater leverage to the operator.

Thus it will be seen that I have provided an efficient hedge shear construction in which one of the blades pivots in two directions at right angles relative to the other, namely, in the ordinary cutting plane and in a plane at right angles thereto, the latter pivotal movement being resisted by a spring; also I have provided a novel adjustable handle means which not only enables pivotal adjustment of the handle relative to the blades, but permits replacement of the handles with considerably longer handles for enabling the cutting of high tree branches and the like; also I have provided hedge shears involving a minimum number of inexpensively manufactured parts.

While I have illustrated and described a single embodiment of my invention, it will be understood that this is by way of illustration only and that various changes and modifications may be made within the contemplation of my invention and within the scope of the following claim.

I claim:

1. Hedge shears comprising a pair of blades pivotally connected together, each having an integral, flat handle shank substantially in the plane of the corresponding blade; a bearing block rigidly mounted on each of said shanks and having a pivotal bolt, a clamp tiltably mounted vertically on each of said bearing blocks in the direction of, and at right angles to, the plane of the corresponding blade, fastening means for said clamp, and a handle having an end portion which is telescopically fitted to and tightly clamped by said fastening means of the corresponding tiltable clamp along selective longitudinal portions of the handle to selectively adjust the effective length of the handle and whereby said handles may be readily removed and substituted by longer or shorter handles simply by loosening said fastening means and thereby unclamping said clamps, and whereby said handles may be selectively arranged in either parallel or angular offset relationship to said shanks merely by loosening and tightening said bearing block pivotal bolt.

References Cited

UNITED STATES PATENTS

| 894,710 | 7/1908 | Selley | 30—257 |
| 2,840,906 | 7/1958 | Keiser | 30—268 |

FOREIGN PATENTS

| 26,779 | 12/1908 | Great Britain | 30—257 |
| 213,663 | 7/1956 | Australia | 30—257 |
| 957,906 | 5/1964 | Great Britain | 30—257 |

ROBERT C. RIORDON, Primary Examiner

J. C. PETERS, Assitsant Examiner

U.S. Cl. X.R.

30—268